United States Patent
Lee et al.

(10) Patent No.: US 11,023,042 B1
(45) Date of Patent: Jun. 1, 2021

(54) METHOD FOR INPUTTING GAZE FOR DISPLAY AND DEVICES PERFORMING THE SAME

(71) Applicant: Korea Advanced Institute Of Science And Technology, Daejeon (KR)

(72) Inventors: Geehyuk Lee, Daejeon (KR); Sunggeun Ahn, Daejeon (KR); Jeongmin Son, Daejeon (KR); Sangyoon Lee, Daejeon (KR)

(73) Assignee: Korea Advanced Institute Of Science And Technology, Daejeon (KR)

( * ) Notice: Subject to any disclaimer, the term of this patent is extended or adjusted under 35 U.S.C. 154(b) by 0 days.

(21) Appl. No.: 16/830,727

(22) Filed: Mar. 26, 2020

(30) Foreign Application Priority Data

Mar. 10, 2020 (KR) .................. 10-2020-0029594

(51) Int. Cl.
*G06F 3/01* (2006.01)
*G02B 27/00* (2006.01)
*G02B 27/01* (2006.01)

(52) U.S. Cl.
CPC .......... *G06F 3/013* (2013.01); *G02B 27/0093* (2013.01); *G02B 2027/014* (2013.01); *G02B 2027/0136* (2013.01); *G02B 2027/0187* (2013.01)

(58) Field of Classification Search
CPC ............... G06F 3/013; G02B 27/0093; G02B 2027/014; G02B 2027/0187; G02B 27/017; G06T 19/006
See application file for complete search history.

(56) References Cited

U.S. PATENT DOCUMENTS

| | | | | |
|---|---|---|---|---|
| 2015/0310657 A1* | 10/2015 | Eden | ................... | G06F 3/04812 705/14.45 |
| 2015/0355815 A1* | 12/2015 | Palti-Wasserman | ......................... | G06F 3/04817 715/835 |
| 2019/0212815 A1* | 7/2019 | Zhang | ..................... | G06F 3/013 |

OTHER PUBLICATIONS

Toyama, T., et al., "Attention Engagement and Cognitive State Analysis for Augmented Reality Text Display Functions," *IUI '15: Proceedings of the 20th International Conference on Intelligent User Interfaces*, Mar. 2015, pp. 322-332, 11 pages.

Vidal, M., et al., "Pursuits: Spontaneous Interaction with Displays based on Smooth Pursuit Eye Movement andMoving Targets," *UbiComp '13*, Sep. 8-12, 2013 pp. 439-448, 10 pages.

Lee, Y., et al., "Method for Automatic Switching Screen of OST-HMD using Gaze Depth Estimation," in Japanese with English Abstract, *Smart Medica Journal*, vol. 7, No. 1, Mar. 2018, pp. 31-38, 6 pages.

* cited by examiner

*Primary Examiner* — Koosha Sharifi-Tafreshi
(74) *Attorney, Agent, or Firm* — Inskeep IP Group, Inc.

(57) ABSTRACT

A method for inputting gaze for a display and devices performing the same are disclosed. A method for inputting gaze for a display according to an example embodiment includes sensing gaze of a user and moving symbols displayed on both eyes of the user through the display, determining whether the both eyes move in a vergence manner based on the movements of the symbols to converge or diverge, and determining whether the gaze is directed to the symbols based on the determination result.

14 Claims, 8 Drawing Sheets

METHOD FOR INPUTTING GAZE FOR DISPLAY AND DEVICES PERFORMING THE SAME

CROSS-REFERENCE TO RELATED APPLICATIONS

This application claims the benefit of Korean Patent Application No. 10-2020-0029594, filed on Mar. 10, 2020, in the Korean Intellectual Property Office, the disclosure of which is incorporated herein by reference.

FIELD OF THE INVENTION

Example embodiments relate to a method for inputting gaze for a display and devices performing the same.

DESCRIPTION OF THE RELATED ART

A binocular near-eye display may be a facial wearable device developed for augmented reality and virtual reality. For example, the facial wearable device may be an essential device for implementing augmented reality and virtual reality technologies. The facial wearable device may be a device having a potential to be universalized rapidly in consideration of market expectations for the augmented reality and virtual reality technologies.

The binocular near-eye display is a device located in front of both eyes of a user, so that the binocular near-eye display may be suitable for tracking movements of the both eyes of the user. For example, gaze tracking device manufacturers have commercialized a gaze tracking device in a form of glasses, and augmented reality and virtual reality display devices capable of gaze tracking. Considering a flow of such market, an interaction aspect based on the gaze tracking in the binocular near-eye display device may be a technology that will become more and more common in the future.

A representative gaze input method includes a technique of staring at a specific button for a certain time for a button input. In this connection, the gaze input method may be an input method in which an act of staring at an object is assumed to have an input intention.

SUMMARY

An aspect provides a technology of determining whether gaze of a user is directed to symbols based on whether the gaze of the user moves in a vergence manner based on movements of the symbols.

However, the technical problem may not be limited to the above technical problem, and there may be other technical problems.

According to an aspect, there is provided a method for inputting gaze for a display including sensing gaze of a user and moving symbols displayed on both eyes of the user through the display, determining whether the both eyes move in a vergence manner based on the movements of the symbols to converge or diverge, and determining whether the gaze is directed to the symbols based on the determination result.

The method may further include providing an input corresponding to the symbols when the gaze is directed to the symbols.

The symbols may be respectively displayed at positions corresponding to the gaze.

The symbols may include a left eye symbol displayed on a left eye of the user through a first display, and a right eye symbol displayed on a right eye of the user through a second display.

The moving of the symbols displayed on the both eyes of the user through the display may include displaying the left eye symbol on the first display, displaying the right eye symbol on the second display, and moving the left eye symbol and the right eye symbol differently from each other.

The moving of the left eye symbol and the right eye symbol differently from each other may include moving the left eye symbol and the right eye symbol to be farther away from or to be closer to each other in a left and right direction of the both eyes.

An amount of change in the movement of the left eye symbol and an amount of change in the movement of the right eye symbol may be the same.

The determining of whether the both eyes move in the vergence manner to converge or diverge may include sensing the movements of the both eyes, determining whether the movements of the left eye symbol and the right eye symbol are similar to the movements of the both eyes, and determining whether the movements of the both eyes are movements of changing foci of the both eyes by the vergence based on the movements of the left eye symbol and the right eye symbol when the movements of the left eye symbol and the right eye symbol are similar to the movements of the both eyes.

The determining of whether the movements of the left eye symbol and the right eye symbol are similar to the movements of the both eyes may include calculating a first similarity by comparing a moving direction and an amount of change in the movement of the left eye symbol with a moving direction and an amount of change in the movement of the left eye, calculating a second similarity by comparing a moving direction and an amount of change in the movement of the right eye symbol with a moving direction and an amount of change in the movement of the right eye, calculating a third similarity based on the first similarity and the second similarity, and determining whether the movements of the left eye symbol and the right eye symbol are similar to the movements of the both eyes based on the third similarity.

The method may further include determining whether, through movements of symbols corresponding to re-sensed gaze, the re-sensed gaze is directed to the symbols corresponding to the re-sensed gaze when the gaze is not directed to the symbols.

According to an aspect, there is provided a device for inputting gaze for a display including a memory including instructions, and a controller that executes the instructions, wherein the controller senses gaze of a user and move symbols displayed on both eyes of the user through the display, determines whether the both eyes move in a vergence manner based on the movements of the symbols to converge or divergence, and determines whether the gaze is directed to the symbols based on the determination result.

The controller may provide an input corresponding to the symbols when the gaze is directed to the symbols.

The symbols may be respectively displayed at positions corresponding to the gaze.

The symbols may include a left eye symbol displayed on a left eye of the user through a first display, and a right eye symbol displayed on a right eye of the user through a second display.

The controller may display the left eye symbol on the first display, display the right eye symbol on the second display, and move the left eye symbol and the right eye symbol differently from each other.

The controller may move the left eye symbol and the right eye symbol to be farther away from or to be closer to each other in a left and right direction of the both eyes.

An amount of change in the movement of the left eye symbol and an amount of change in the movement of the right eye symbol may be the same.

The controller may sense the movements of the both eyes, determine whether the movements of the left eye symbol and the right eye symbol are similar to the movements of the both eyes, and determine whether the movements of the both eyes are movements of changing foci of the both eyes by the vergence based on the movements of the left eye symbol and the right eye symbol when the movements of the left eye symbol and the right eye symbol are similar to the movements of the both eyes.

The controller may calculate a first similarity by comparing a moving direction and an amount of change in the movement of the left eye symbol with a moving direction and an amount of change in the movement of the left eye, calculate a second similarity by comparing a moving direction and an amount of change in the movement of the right eye symbol with a moving direction and an amount of change in the movement of the right eye, calculate a third similarity based on the first similarity and the second similarity, and determine whether the movements of the left eye symbol and the right eye symbol are similar to the movements of the both eyes based on the third similarity.

According to an aspect, there is provided a system for inputting gaze including a display near to both eyes of a user, and a gaze input device, wherein the gaze input device senses gaze of a user and move symbols displayed on both eyes of the user through the display, determines whether the both eyes move in a vergence manner based on the movements of the symbols to converge or diverge, and determines whether the gaze is directed to the symbols based on the determination result.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various changes may be made to the example embodiments, so that the scope of the patent application is not limited or restricted by such example embodiments. It is to be understood that all changes, equivalents, and substitutes of the example embodiments are included in the scope of the invention.

The terms used in the example embodiments are for the purpose of description only and should not be construed as limiting. In the specification, the singular forms include plural forms unless particularly mentioned. It is to be understood that the terms "comprises" and/or "comprising" used herein are intended to indicate that there are features, numbers, steps, operations, components, parts, and/or combinations thereof, and do not exclude presence or addition of one or more other features, numbers, steps, operations, components, parts, and/or combinations thereof.

Terms such as first, second, or the like may be used to describe various components, but the components should not be limited by the terms. Terms are only used to distinguish one component from another. For example, without departing from the scope of the example embodiment, a first component may be named as a second component, and similarly, the second component may also be referred to as the first component.

Unless otherwise defined, all terms including technical and scientific terms used herein have the same meaning as commonly understood by one of ordinary skill in the art to which the example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, in the description with reference to the accompanying drawings, the same components regardless of reference numerals will be given the same reference numerals and redundant description thereof will be omitted. Further, in describing the example embodiments, a detailed description of the related known configuration or function will be omitted when it is determined that it interferes with the understanding of the example embodiments.

Figure 1:
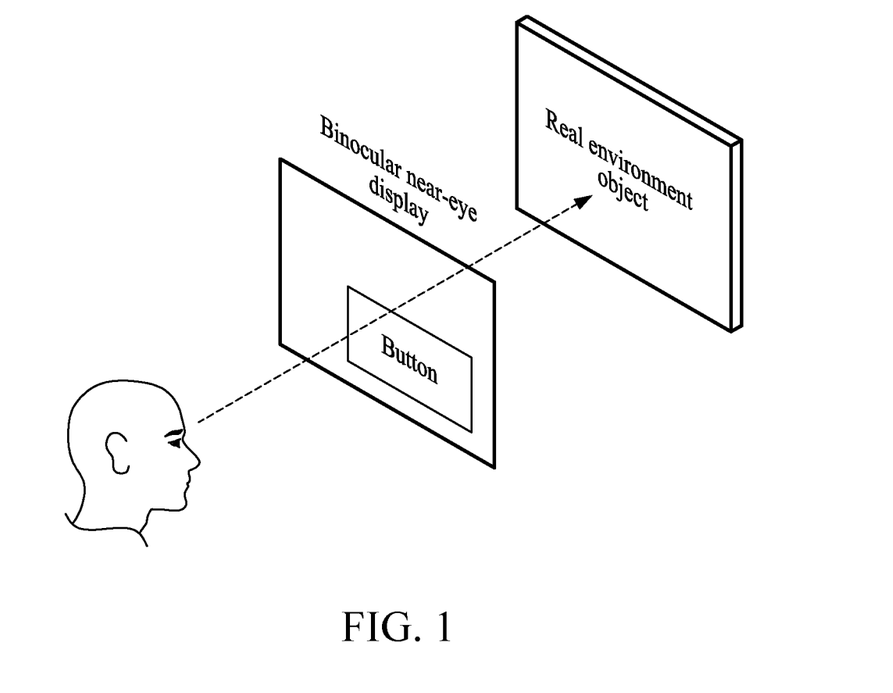
FIG. 1 illustrates an example for describing gaze of a user.

FIG. 1 illustrates an example for describing gaze of a user.

The user may wear an head mounted display (HMD), which is a facial wearable device, to receive visual content such as augmented reality and/or virtual reality, and may perform gaze input through the gaze. The facial wearable device may provide the visual content to the user through a binocular near-eye display.

When the binocular near-eye display is transparent or translucent, and when the user stares at one point for a certain time, a midas touch may occur. The midas touch may be a problem in which whether the user is staring at an object on a display with an input intention or is staring at a real object located in a real environment beyond the display is ambiguous.

The midas touch problem may be greater, especially when the binocular near-eye display is a near-eye optical see through display. A gaze input method for the display according to an example embodiment will be proposed to solve such midas touch problem. The gaze input method for the display according to the example embodiment may, when respectively providing specific symbols to both eyes through the display, use movements of the both eyes respectively based on movements of the specific symbols.

When the user stares at the specific symbol (fixation) or when the gaze of the user follows the specific symbol (smooth pursuit), the eye movement of the user may be similar to the movement of the specific symbol. Hereinafter, the movement of the gaze of the user (or of the both eyes of the user) similar to the movement of the specific symbol will be referred to as an 'induced gaze movement (an induced both-eyes movement)'. The induced gaze movement may be a movement by a vergence that does not occur easily in everyday life.

When the user stares at the specific symbols that are specific objects on a three-dimensional space provided by the binocular near-eye display, and when the specific symbols move the both eyes of the user in a vergence manner, the both eyes of the user are moved in the vergence manner similar to the movements of the specific symbols, which may result in the 'induced gaze movement'. The vergence may be a movement in which the both eyes of the user converge or diverge to obtain a binocular single vision.

Figure 2:
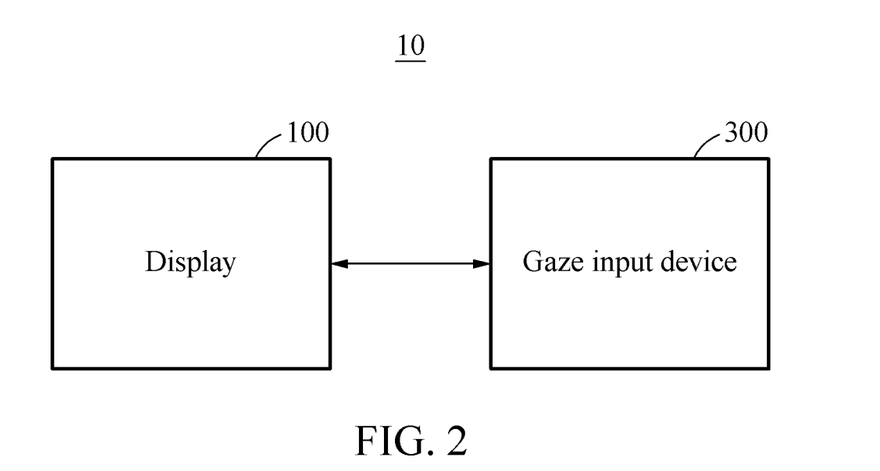
FIG. 2 illustrates a schematic block diagram of a gaze input system according to one example embodiment.
Figure 3:
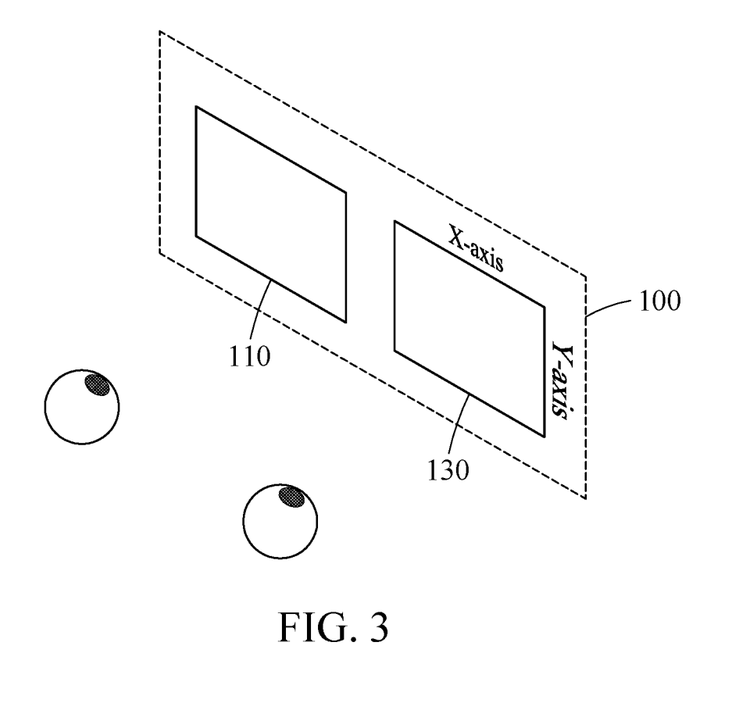
FIG. 3 illustrates an example for describing a display illustrated in FIG. 2.

FIG. 2 illustrates a schematic block diagram of a gaze input system according to one example embodiment. Further, FIG. 3 illustrates an example for describing a display illustrated in FIG. 2.

A gaze input system 10 includes a display 100 and a gaze input device 300. The gaze input system 10 may be a device capable of providing various visual contents such as the augmented reality and/or the virtual reality to the user. For example, the gaze input system 10 may be the HMD that is able to be worn by the user.

The display 100 may be a binocular near-eye optical see through display applicable to the facial wearable device. The display 100 may display the various visual contents such as the augmented reality and/or the virtual reality to the both eyes of the user.

The display 100 may include a first display 110 and a second display 130. The first display 110 may be a left-eye near-eye display near to a left eye of the user, and the second display 130 may be a right-eye near-eye display near to a right eye of the user.

The gaze input device 300 may provide an appropriate input based on the gaze by distinguishing whether the gaze of the user is directed to an object displayed on the display 100 or is directed to a real object that exists beyond the display 100 (e.g., an object located in a real environment).

For example, the gaze input device 300 may determine whether the gaze of the user is directed to the symbol based on whether the gaze of the user moves in the vergence manner based on the movements of the symbols. In this connection, the gaze input device 300 may move a left eye symbol and a right eye symbol such that, although a fixation point of the gaze of the user is fixed on a two-dimensional space (or a two-dimensional planar space (an x-y plane)), a depth of the gaze changes in a z-axis, so that the symbols are perceived as moving forward or backward. The symbols may be moved in a very small range in the two-dimensional planar space.

Accordingly, the gaze input device 300 may overcome any unintended input of the user called as the midas touch, that is, the midas touch, and accurately provide an input corresponding to the gaze of the user.

In addition, the gaze input device 300 may reduce visual distraction of the user to be less distracting when the user performs a task that does not interact with the display 100.

Hereinafter, it is assumed that the user uses the HMD, which is the facial wearable device, and the facial wearable device includes the display 100 and the gaze input device 300. The display 100 and the gaze input device 300 may be included in the HMD, but are not limited thereto. The display 100 and the gaze input device 300 may be implemented independently of the HMD and mounted on the HMD. In this connection, the display 100 may perform communication with the HMD and the gaze input device 300. The gaze input device 300 may perform communication with the HMD and the display 100.

Figure 4:
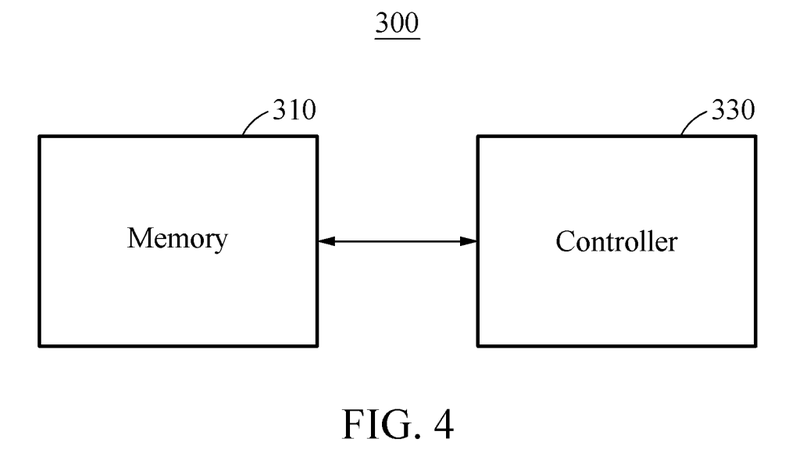
FIG. 4 illustrates a schematic block diagram of a gaze input device illustrated in FIG. 2.

FIG. 4 illustrates a schematic block diagram of a gaze input device illustrated in FIG. 2.

The gaze input device 300 may include a memory 310 and a controller 330.

The memory 310 may store instructions (or programs) executable by the controller 330. For example, the instructions may include instructions for executing an operation of the controller 330 and/or an operation of each component of the controller 330.

The controller 330 may process data stored in the memory 310. The controller 330 may execute computer-readable codes (e.g., software) stored in the memory 310 and instructions induced by the controller 330.

The controller 330 may be a data processing device implemented in hardware having a circuit having a physical structure for executing desired operations. For example, the desired operations may include codes or instructions included in the program.

For example, the data processing device implemented in the hardware may include a microprocessor, a central processing unit, a processor core, a multi-core processor, a multiprocessor, an application-specific integrated circuit (ASIC), and a field programmable gate array (FPGA).

The controller 330 may control overall operations of the gaze input device 300. For example, the controller 330 may control an operation of the memory 310.

The controller 330 may sense the gaze of the user and move the symbol displayed on the both eyes of the user through the display 100.

The symbols may be symbols displayed at locations corresponding to the gaze of the user. The symbol may include the left eye symbol and the right eye symbol. The left eye symbol and the right eye symbol may be in the same visual form as symbols having a form similar to (or the same as) the symbol form.

For example, the controller 330 may move the symbol through a graphic user interface of the display 100. The graphic user interface may be an interface that provides the movement of the visual symbol.

First, the controller 330 may display the left eye symbol and the right eye symbol on the both eyes of the user. For example, the controller 330 may display the left eye symbol on the first display 110 such that the left eye symbol is displayed on the left eye of the user. The controller 330 may display the right eye symbol on the second display 130 such that the right eye symbol is displayed on the right eye of the user.

Subsequently, the controller 330 may provide different visual stimuli respectively to the both eyes of the user and move the left eye symbol and the right eye symbol differently to move the both eyes of the user in the vergence manner.

For example, the controller 330 may move the left eye symbol and the right eye symbol in different directions to move the both eyes of the user in the vergence manner, so that the both eyes of the user may move to be farther away from each other or to be close to each other in a left and right direction of the both eyes of the user. The left eye symbol and the right eye symbol may move in opposite directions on a horizontal axis, which is in the left and right direction of the both eyes. An amount of change in the movement of the left eye symbol and an amount of change in the movement of the right eye symbol may be the same.

The controller 330 may sense the movement of the gaze (or the movements of the both eyes) of the user to determine whether the movement of the gaze is the induced gaze movement based on the movement of the symbol. In this connection, the controller 330 may continuously track and sense the gaze of the user. The controller 330 may use an algorithm for discriminating the induced gaze movement of the user. The algorithm may determine whether the gaze of the user is the induced gaze movement by observing gaze movements of both eyes of the user and comparing movement patterns of the both eyes with movement patterns of the symbols.

For example, the controller 330 may determine whether the gaze movement of the user is the induced gaze movement by comparing a degree of convergence or divergence of the both eyes of the user with a degree at which the left eye symbol and the right eye symbol move to be away from or closer to each other. The controller 330 may determine whether the gaze movement of the user is the induced gaze movement by identifying how similarly gaze positions of the left eyes and the right eyes (or the movements of the left eye and the right eye) move with the left eye symbol and the right eye symbol, respectively.

Specifically, the controller 330 may determine whether the movements of the left eye symbol and the right eye symbol are similar to the movements of the both eyes of the user.

The controller 330 may calculate fixation points of the left eye and the right eye of the user. In this connection, the fixation points may be obtained by calculating a three-dimensional eye model or measuring a two-dimensional position of a pupil. In the scheme of calculating the three-dimensional eye model, an intersecting point of gaze vectors of the both eyes is calculated based on each gaze direction (or each gaze vector) of each of the both eyes of the user and each of three-dimensional positions of each of the both eyes to calculate a position of a space from which binocular single vision is obtained (or the fixation points).

The controller 330 may calculate a first similarity between the movement of the left eye symbol and the movement of the left eye by comparing the moving direction and the amount of change in the movement of the left eye symbol with the moving direction and an amount of change in the movement of the left eye. The controller 330 may calculate a second similarity between the movement of the right eye symbol and the movement of the right eye by comparing the moving direction and the amount of change in the movement of the right eye symbol with the moving direction and an amount of change in the movement of the right eye. The moving directions and the amounts of change in the movement of the left eye and the right eye may be obtained from the fixation point calculation.

The controller 330 may calculate a third similarity (or a final similarity) between the movements of the symbols and the movements of the both eyes based on the first similarity and the second similarity. The controller 330 may determine whether the movements of the left eye symbol and the right eye symbol and the movements of the both eyes are similar to each other based on the third similarity. When the similarity between the two movements (the movements of the symbols and the both eyes) within a specific time range satisfies a specific criterion, the controller 330 may determine the movement of the gaze (or the both eyes) of the user as the gaze movement induced by the symbol.

In a case in which the movements of the both eyes of the user are the induced movements of the both eyes, the controller 330 may determine whether the induced movements of the both eyes are movements in which foci of the both eyes are changed by the vergence based on the movements of the left eye symbol and the right eye symbol. When the left eye symbol and the right eye symbol move to be farther away from each other, and when the both eyes of the user move in a manner of vergence of diverging similarly to the movements of the left eye symbol and the right eye symbol, the controller 330 may determine that the induced movements of the both eyes are a divergence vergence based on the movements of the left eye symbol and the right eye symbol. When the left eye symbol and the right eye symbol move to be closer to each other, and when the both eyes of the user move in a manner of vergence of converging similarly to the movements of the left eye symbol and the right eye symbol, the controller 330 may determine that the induced movements of the both eyes are a convergence vergence based on the movements of the left eye symbol and the right eye symbol.

In the above-described determination method, as an example, another algorithm for determining the similarity between the two movements (the movements of the symbol and the both eyes) may be utilized.

The controller 330 may determine whether the gaze of the user is directed to the symbol based on the determination result. For example, when the gaze movement of the user is the induced gaze movement and is a movement in which the foci of the both eyes of the user are changed by the vergence based on the symbols, the controller 330 may determine that the user is staring at the symbol.

As a result, the controller 330 may determine whether the gaze movement of the user is the induced gaze movement to determine whether the user is staring at (or is focusing on) a visual symbol for inducing a specific gaze movement.

In this connection, the eye movement induced by the symbol is an eye movement difficult to be reproduced voluntarily, and the corresponding eye movement is an eye movement that is distinguished from a natural eye movement in the everyday life.

Accordingly, the controller 330 may determine whether the user is staring at the object on the display or another object beyond the display depending on whether the user is staring at the symbol.

The controller 330 may provide the gaze input based on whether the user is staring at the symbol. When the gaze of the user is directed to the symbol, the controller 330 may provide an input corresponding to the symbol. When the gaze of the user is not directed to the symbol, the controller 330 may re-sense the gaze of the user and repeat the above-described process, thereby determining whether a symbol corresponding to re-sensed gaze is stared at from the re-sensed gaze movement. For example, the controller 330 may determine whether the re-sensed gaze is directed to the symbol corresponding to the re-sensed gaze through a movement of the symbol corresponding to the re-sensed gaze.

Figure 5A:
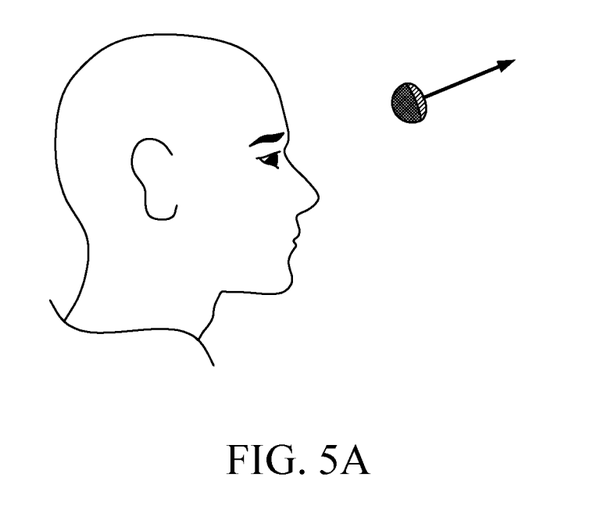
FIG. 5A illustrates an example for describing a vergence of diverging.
Figure 5B:
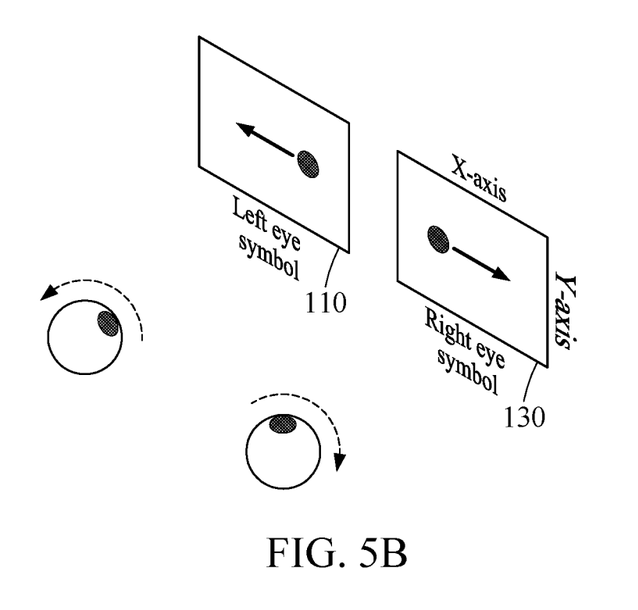
FIG. 5B illustrates movements of symbols for inducing a vergence of diverging.
Figure 5C:
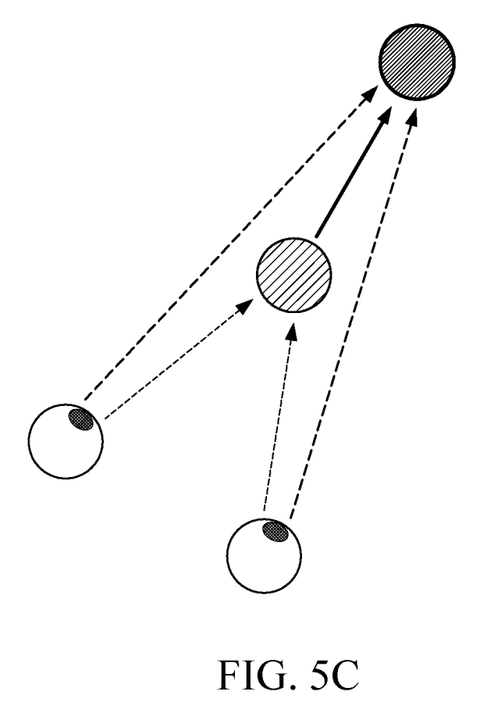
FIG. 5C illustrates an example for describing recognition of a user based on a vergence of diverging.

FIG. 5A illustrates an example for describing a vergence of diverging. Further, FIG. 5B illustrates movements of symbols for inducing a vergence of diverging. Further, FIG. 5C illustrates an example for describing recognition of a user based on a vergence of diverging.

Referring to FIG. 5A, when the user is located in the three-dimensional space and is staring at an object moving to be farther away from the user, the both eyes of the user may be induced to move in the manner of the vergence of diverging.

Referring to FIG. 5B, the controller 330 may move the left eye symbol and the right eye symbol of the symbols to be farther away from each other on an x-axis such that an induced gaze movement based on movements of symbols corresponding to objects respectively occur in the both eyes of the user as shown in FIG. 5A.

When the user stares at the objects, the left eye and the right eye of the user may respectively follow the movements of the left eye symbol and the right eye symbol to obtain the binocular single vision. Thus, the both eyes of the user may be induced to move in the manner of the vergence of diverging respectively based on the movements of the left eye symbol and the right eye symbol. In this connection, the user may recognize that the symbols are fixed on the two-dimensional space (the x-y plane) and move only in the vertical z-axis.

Thus, the controller 330 may determine whether the gaze movement of the user is the 'induced gaze movement' by determining only 1) whether two-dimensional coordinates of the fixation points are fixed stably as the fixation points of the both eyes of the user are fixed on the two-dimensional space, and 2) whether the both eyes of the user are diverging in the same form as the symbols. When the two cases are satisfied, the controller 330 may determine that the gaze movement of the user is the 'induced gaze movement' that diverges by the symbols.

When the user is not staring at the objects, the both eyes of the user may not be induced to move in the manner of the vergence of diverging or the divergence vergence occurred in the both eyes may move in a movement pattern different from those of the left eye symbol and the right eye symbol.

Referring to FIG. 5C, when the user stares at an object and the 'induced gaze movement' of diverging occurs based on the movement of the symbol, the user may perceive (or recognize) that the object is moving to be farther away from the user.

Figure 6A:
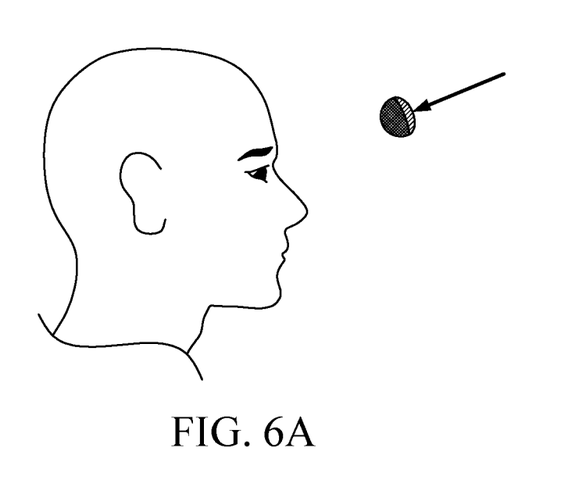
FIG. 6A illustrates an example for describing a vergence of converging.
Figure 6B:
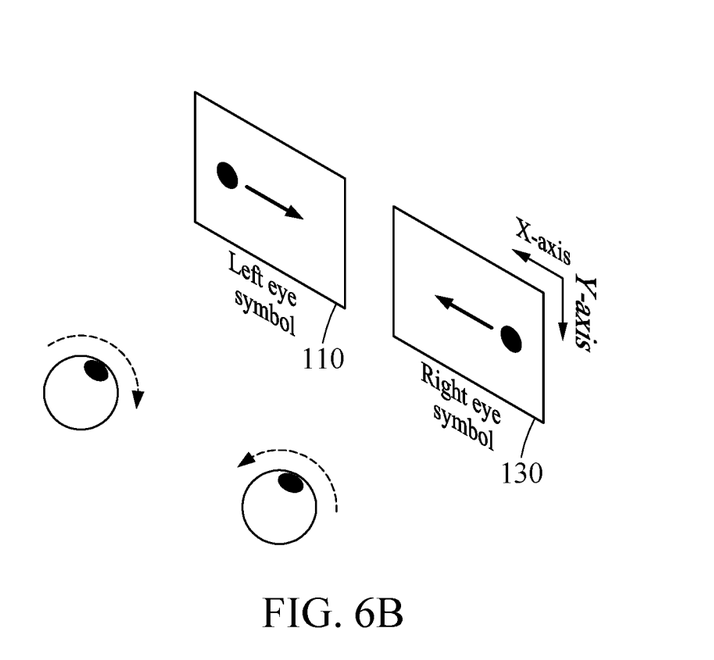
FIG. 6B illustrates movements of symbols for inducing a vergence of converging.
Figure 6C:
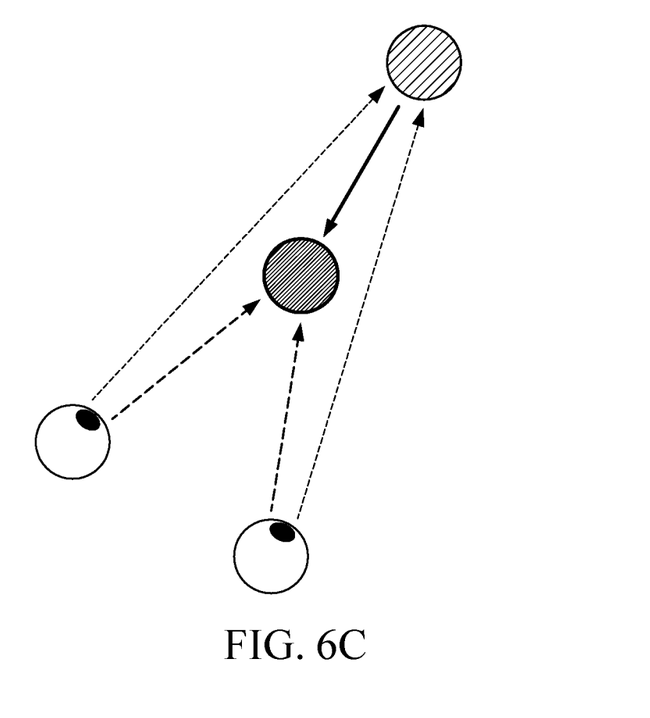
FIG. 6C illustrates an example for describing recognition of a user based on a vergence of converging.

FIG. 6A illustrates an example for describing a vergence of converging. Further, FIG. 6B illustrates movements of symbols for inducing a vergence of converging. Further, FIG. 6C illustrates an example for describing recognition of a user based on a vergence of converging.

Referring to FIG. 6A, when the user is located in the three-dimensional space and is staring at an object moving to be closer to the user, the both eyes of the user may be induced to move in the manner of the vergence of converging.

Referring to FIG. 6B, the controller 330 may move the left eye symbol and the right eye symbol of the symbols to be closer to each other on the x-axis such that an induced gaze movement based on movements of symbols corresponding to objects respectively occur in the both eyes of the user as shown in FIG. 6A.

When the user stares at the objects, the left eye and the right eye of the user may respectively follow the movements of the left eye symbol and the right eye symbol to obtain the binocular single vision. Thus, the both eyes of the user may be induced to move in the manner of the vergence of converging respectively based on the movements of the left eye symbol and the right eye symbol. In this connection, the user may recognize that the symbols are fixed on the two-dimensional space (the x-y plane) and move only in the vertical z-axis.

Thus, the controller 330 may determine whether the gaze movement of the user is the 'induced gaze movement' by determining only 1) whether the two-dimensional coordinates of the fixation points are fixed stably as the fixation points of the both eyes of the user are fixed on the two-dimensional space, and 2) whether the both eyes of the user are converging in the same form as the symbols. When the two cases are satisfied, the controller 330 may determine that the gaze movement of the user is the 'induced gaze movement' that diverges by the symbols.

When the user is not staring at the objects, the both eyes of the user may not be induced to move in the manner of the vergence of converging or the convergence vergence occurred in the both eyes may move in a movement pattern different from those of the left eye symbol and the right eye symbol.

Referring to FIG. 6C, when the user stares at an object and the 'induced gaze movement' of converging occurs based on the movement of the symbol, the user may perceive (or recognize) that the object is moving to be closer to the user.

Figure 7A:
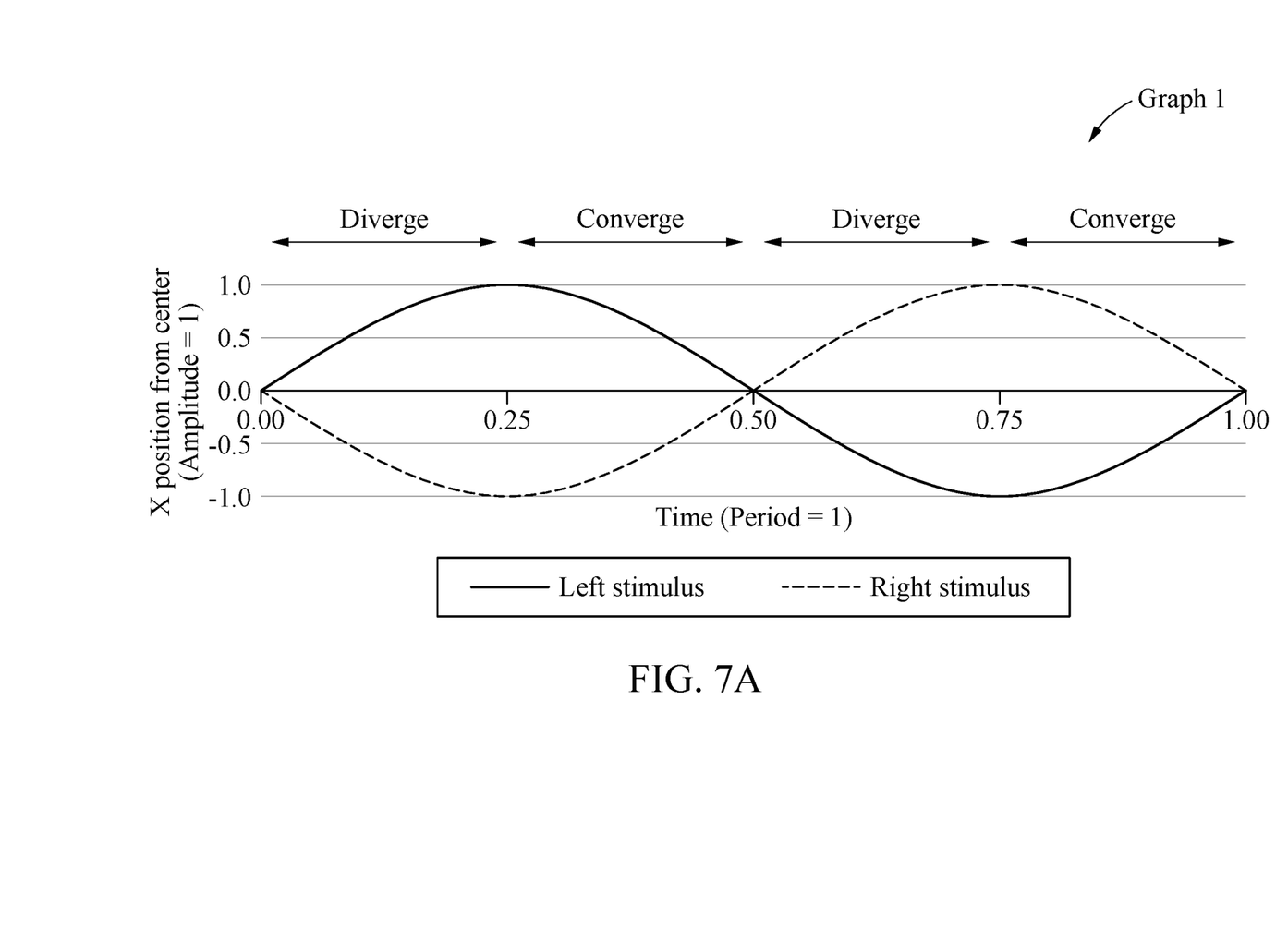
FIG. 7A illustrates an example for describing divergence and convergence sections of a symbol.

FIG. 7A illustrates an example for describing divergence and convergence sections of a symbol. Further, FIG. 7B illustrates an example for describing an induced gaze movement.

Referring to FIG. 7A, the left eye symbol and the right eye symbol may repeat a diverging movement (divergence) and a converging movement (convergence) as shown in graph 1. In this connection, an x-axis of the graph 1 may mean time and a y-axis may mean a position on a horizontal axis from reference points of the left eye symbol and the right eye symbol.

The left eye symbol and the right eye symbol may move to be farther away from or to be closer to each other in a sinusoidal manner. As described above, a form in which the left eye symbol and the right eye symbol move to be farther away from or to be closer to each other is a sine wave form, but is not limited thereto. For example, the form in which the left eye symbol and the right eye symbol move to be farther away from each other or to be closer to each other may be various waveforms, such as a triangular wave. The both eyes of the user may be induced to move in the manner of the vergence of diverging when the left eye symbol and the right eye symbol move to be farther away from each other, and may be induced to move in the manner of vergence of converging when the left eye symbol and the right eye symbol move to be closer to each other.

Figure 7B:
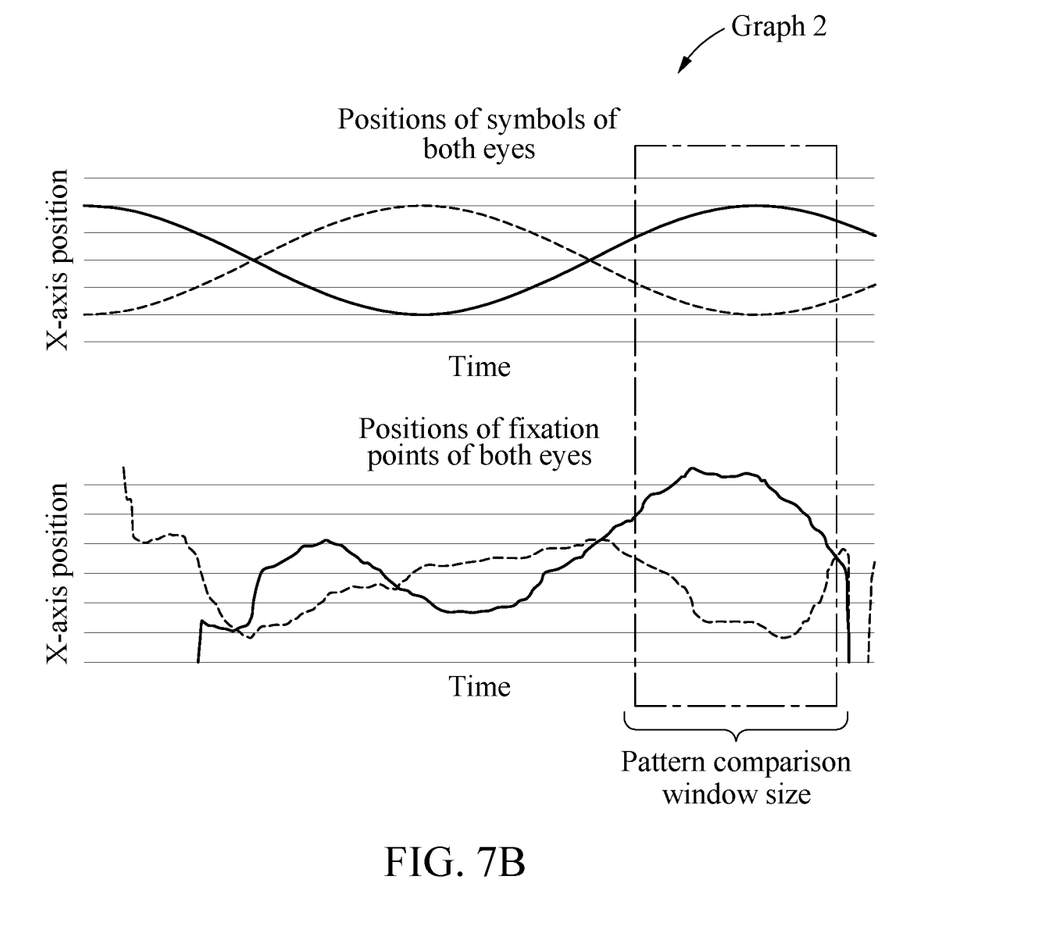
FIG. 7B illustrates an example for describing an induced gaze movement.

Referring to FIG. 7B, when locations of the fixation points of the both eyes of the user represent a pattern similar to that of the movements of the symbols as in a shaded region (or a specific time range) while the left eye symbol and the right eye symbol are constantly moving in a specific pattern, the controller 330 may determine that the user is staring at the symbols of the both eyes.

Figure 8:
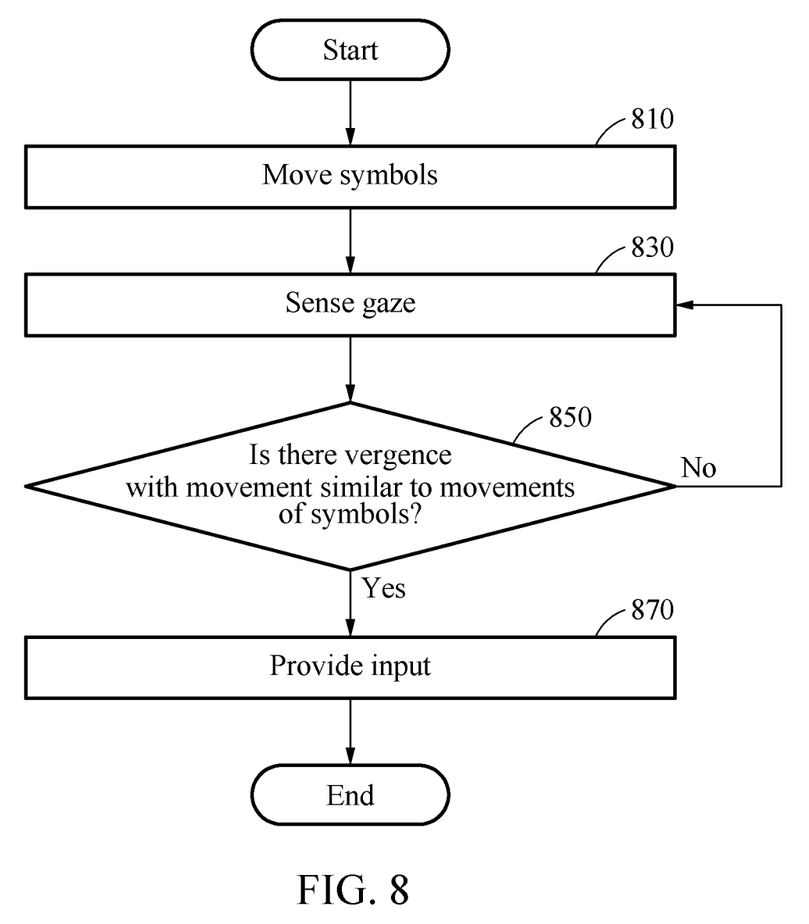
FIG. 8 illustrates a flowchart for describing an operation of a gaze input device illustrated in FIG. 1.

FIG. 8 illustrates a flowchart for describing an operation of a gaze input device illustrated in FIG. 1.

The controller 330 may sense the gaze of the user and move the left eye symbol corresponding to the left eye of the user and the right eye symbol corresponding to the right eye of the user to be farther away from each other or to be closer to each other in the different directions (810).

The controller 330 may sense the movement of the gaze of the user after moving the symbols (830).

The controller 330 may determine whether the movement of the gaze of the user is the induced gaze movement based on the movements of the left eye symbol and the right eye symbol, and determine whether the vergence in which the gaze of the user diverges or converges based on the induced gaze movement is induced.

When the gaze movement of the user is the induced gaze movement, and when the vergence of diverging or converging is induced, the controller 330 may provide the input corresponding to the symbols.

When the gaze movement of the user is not the induced gaze movement, and when the vergence of diverging or converging is not induced, the controller 330 may re-sense the gaze movement of the user and repeat the above-described process for the re-sensed gaze.

The methods according to the above-described example embodiments may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the example embodiments or be known and available to those skilled in computer software. The computer-readable media include magnetic media such as hard disks, floppy disks, and magnetic tape; optical media such as CD-ROMs and DVDs; magneto-optical media such as floptical disks; and hardware devices that are specially configured to store and perform program instructions, such as ROM, RAM, flash memory, and the like. Program instructions include both machine codes, such as produced by a compiler, and higher level codes that may be executed by the computer using an interpreter. The hardware device described above may be configured to operate as one or more software modules to perform the operations in the example embodiment, and vice versa.

Software may include computer programs, codes, instructions or one or more combinations thereof and may configure a processing unit to operate in a desired manner or may independently or collectively control the processing unit. Software and/or data may be embodied in any type of machine, components, physical equipment, virtual equipment, computer storage media or units so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

While the example embodiments have been described with reference to the limited drawings, it will be apparent to those skilled in the art that various modifications and variations can be made from the foregoing descriptions. For example, adequate results may be achieved even if the technologies described are carried out in different order than described method, and/or the aforementioned components, such as systems, structures, devices, or circuits, are combined or coupled in different forms than as described above, or be substituted or switched with other components or equivalents.

Therefore, other implementations, other example embodiments, and equivalents to the claims are within the scope of the following claims.

What is claimed is:

1. A method for inputting gaze for a display, the method comprising:
    sensing gaze of a user and moving symbols displayed on both eyes of the user through the display;
    determining whether the both eyes move in a vergence manner based on the movements of the symbols to converge or diverge; and
    determining whether the gaze is directed to the symbols based on the determination result, and
    wherein the symbols include:
    a left eye symbol displayed on a left eye of the user through a first display; and
    a right eye symbol displayed on a right eye of the user through a second display, and
    wherein the moving of the symbols displayed on the both eyes of the user through the display includes:
    displaying the left eye symbol on the first display;
    displaying the right eye symbol on the second display; and
    moving the left eye symbol and the right eye symbol differently from each other.

2. The method of claim 1, further comprising:
    providing an input corresponding to the symbols when the gaze is directed to the symbols.

3. The method of claim 1, wherein the symbols are respectively displayed at positions corresponding to the gaze.

4. The method of claim 1, wherein the moving of the left eye symbol and the right eye symbol differently from each other includes:
    moving the left eye symbol and the right eye symbol to be farther away from or to be closer to each other in a left and right direction of the both eyes.

5. The method of claim 1, wherein the determining of whether the both eyes move in the vergence manner to converge or diverge includes:
    sensing the movements of the both eyes;
    determining whether the movements of the left eye symbol and the right eye symbol are similar to the movements of the both eyes; and
    determining whether the movements of the both eyes are movements of changing foci of the both eyes by the vergence based on the movements of the left eye symbol and the right eye symbol when the movements of the left eye symbol and the right eye symbol are similar to the movements of the both eyes.

6. The method of claim 5, wherein the determining of whether the movements of the left eye symbol and the right eye symbol are similar to the movements of the both eyes includes:
    calculating a first similarity by comparing a moving direction and an amount of change in the movement of the left eye symbol with a moving direction and an amount of change in the movement of the left eye;
    calculating a second similarity by comparing a moving direction and an amount of change in the movement of the right eye symbol with a moving direction and an amount of change in the movement of the right eye;
    calculating a third similarity based on the first similarity and the second similarity; and determining whether the movements of the left eye symbol and the right eye symbol are similar to the movements of the both eyes based on the third similarity.

7. The method of claim 1, further comprising:
determining whether, through movements of symbols corresponding to re-sensed gaze, the re-sensed gaze is directed to the symbols corresponding to the re-sensed gaze when the gaze is not directed to the symbols.

8. A device for inputting gaze for a display, the device comprising:
a memory including instructions; and
a controller configured to execute the instructions,
wherein the controller is configured to:
sense gaze of a user and move symbols displayed on both eyes of the user through the display;
determine whether the both eyes move in a vergence manner based on the movements of the symbols to converge or diverge; and
determine whether the gaze is directed to the symbols based on the determination result, and
wherein the symbols include:
a left eye symbol displayed on a left eye of the user through a first display; and
a right eye symbol displayed on a right eye of the user through a second display, and
wherein the controller is configured to:
display the left eye symbol on the first display;
display the right eye symbol on the second display; and
move the left eye symbol and the right eye symbol differently from each other.

9. The device of claim 8, wherein the controller is configured to provide an input corresponding to the symbols when the gaze is directed to the symbols.

10. The device of claim 8, wherein the symbols are respectively displayed at positions corresponding to the gaze.

11. The device of claim 8, wherein the controller is configured to move the left eye symbol and the right eye symbol to be farther away from or to be closer to each other in a left and right direction of the both eyes.

12. The device of claim 8, wherein the controller is configured to:
sense the movements of the both eyes;
determine whether the movements of the left eye symbol and the right eye symbol are similar to the movements of the both eyes; and
determine whether the movements of the both eyes are movements of changing foci of the both eyes by the vergence based on the movements of the left eye symbol and the right eye symbol when the movements of the left eye symbol and the right eye symbol are similar to the movements of the both eyes.

13. The device of claim 12, wherein the controller is configured to:
calculate a first similarity by comparing a moving direction and an amount of change in the movement of the left eye symbol with a moving direction and an amount of change in the movement of the left eye;
calculate a second similarity by comparing a moving direction and an amount of change in the movement of the right eye symbol with a moving direction and an amount of change in the movement of the right eye;
calculate a third similarity based on the first similarity and the second similarity; and
determine whether the movements of the left eye symbol and the right eye symbol are similar to the movements of the both eyes based on the third similarity.

14. A system for inputting gaze, the system comprising:
a display near to both eyes of a user; and
a gaze input device,
wherein the gaze input device is configured to:
sense gaze of a user and move symbols displayed on both eyes of the user through the display;
determine whether the both eyes move in a vergence manner based on the movements of the symbols to converge or diverge; and
determine whether the gaze is directed to the symbols based on the determination result, and
wherein the symbols include:
a left eye symbol displayed on a left eye of the user through a first display; and
a right eye symbol displayed on a right eye of the user through a second display, and
wherein the controller is configured to:
display the left eye symbol on the first display;
display the right eye symbol on the second display; and
move the left eye symbol and the right eye symbol differently from each other.

* * * * *